US000002010B1

(19) United States

(12) Statutory Invention Registration (10) Reg. No.: US H2010 H

Nguyen et al. (43) Published: Jan. 1, 2002

(54) DOUBLE CUSP GYRO GUN

(75) Inventors: Khanh T. Nguyen, Silver Spring, MD (US); David N. Smithe, Woodridge, VA (US)

(73) Assignee: United States of America, Washington, DC (US)

(21) Appl. No.: 08/397,860

(22) Filed: Mar. 2, 1995

(51) Int. Cl.[7] ..... H01J 3/02

(52) U.S. Cl. ..... 315/111.81; 330/4; 315/1; 315/3.5

*Primary Examiner*—Bernarr E. Gregory

(74) *Attorney, Agent, or Firm*—Thomas E. McDonnell; Charles J. Stockstill

(57) ABSTRACT

A gyrotron gun that generates gyrating electron beams in a controllable manner suitable for use in a wide range of gyro-amplifiers and gyro-oscillators is disclosed. The gyrotron comprises first and second means for abruptly changing a magnetic field and which means are positioned between first, second and third field coils. The field coils are operated so as to provide for a desired magnetic field profile that allows for the control of the parameters desired to provide for small-orbit, large-orbit, and linear modes of operation of the gyrotron gun. The gyrotron gun further comprises of a pair of bucking coils arranging near the cathode to independently control the axial velocity spread of the gyrating electron beam.

9 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOUBLE CUSP GYRO GUN

BACKGROUND OF THE INVENTION

1. Field of the Invention

The present invention relates to the generation of electron beams for use in microwave generators and, more particularly, to the generation of gyrating electron beams in a controllable manner particularly suited for use in a wide range of gyro-amplifiers and gyro-oscillators.

2. Description of the Prior Art

Gyro-amplifiers and gyro-oscillators, which are commonly referred to as gyrotrons, require an electron beam that is different from that which is normally employed in linear microwave tubes, such as klystrons and traveling-wave tubes. In general, and as is known in the art, in gyrotrons microwave energy is extracted from the beam rotational energy through electron orbital phase bunching resulting from resonant interaction between the electron gyration and the transverse component of the electromagnetic waves contained in the interaction circuit, sometimes referred to as cyclotron resonant maser instability. To maximize this resonant interaction process and enhance the efficiency of the gyrotron, it is necessary for the bem forming system, also known as gyrotron gun or gyro-gun, to accomplish the following three factors: (a) form the gyrating electron beam with a large transverse-to-axial velocity ratio, $\alpha=v_\perp/v_z$ typically between one and two; (b) achieve and control the axial velocity, $v_z$, so as to have a low velocity spread in order to provide phase bunching stability; and (c) place the electron's beam guiding center, $r_g$, at the peak of the wave transverse electric field. The attainment of these three factors for all gyrotron device applications has not been accomplished by a single gyro-gun because of certain limitations.

First, the desired factors of the transverse-to-axial velocity ratio, $\alpha=v_\perp/v_z$, and the desired position of the electron's beam guiding center, $r_g$, primarily determine the electron orbital parameter which is different for various gyrotron applications. The selection of these desired factors in a gyro-gun to satisfy a gyrotron device requiring a particular orbit, such as, a small-orbit (non-axis encircling), may not be suitable when the same gyrotron gun is used for another application requiring a different type of orbit, such as, a large-orbit (axis-encircling).

Second, the desired parameter of controlling the axial velocity $v_z$ spread is primarily of importance to the interaction circuit located at the output of the gyrotron gun and which circuit extracts microwave energy from the kinetic energy of the gyrating electron. The axial velocity spread is determined, in part, by the cathode of the gyrotron gun and the operation of the cathode. One approach to control the axial velocity $v_z$ spread is to reduce the cathode's annulus width which, in turn, has the disadvantage of creating higher cathode loading. Another approach is to increase the cathode's mean radius which, in turn, has the disadvantage of increasing the overall size of the gyrotron gun which may not be desired for some applications.

FIRST PROBLEM

In relation to the first problem, several approaches, dictated by the parametric requirements in the beam-wave interaction region, have been used to provide for a desired small-orbit or large-orbit gyrotron beam. Although gyrotron guns designed for a particular parametric requirement serve well their intended function, once built employing existing beam-forming techniques, the gyrotron gun is often difficult to adjust in order to accommodate parameter changes that may arise from time to time. Various beam-forming devices determined by parametric requirements that have been developed prior to 1981 are well documented and summarized in a detailed report by Baird and Attard entitled "Gyrotron Gun Study Report" of the Naval Research Laboratory (NRL) Report TR-3-476 (1981). Each of the approaches prior to 1981 is suitable for use as a beam-forming system for a specific gyrotron device, depending upon the type of beam parameters required. For instance, the gyrotron gun, magnetic injection gun (MIG), originally conceived in the early 1960's, has been continuously used until the present time as a gyrotron beam-forming system and is particularly suited for small-orbit applications, but is not suited as a gyrotron beam-forming system having large-orbit applications. For a large-orbit gyrotron applications, a modified version of a magnetically shielded, space-charged limited Pierce gun (known in the art) has been proposed and is described by G. P. Scheitrum; R. S. Symons; and R. B. True, in the technical article entitled "Low Velocity Spread Axis Encircling Electron Beam Forming System," documented in the Technical Digest of Electron Devices Meeting, pp 743–746 (1989). Accordingly, although various beam-forming techniques are known to accommodate both small and large-orbit gyrotron devices, no one technique is known to accommodate both the small and large-orbit applications.

SECOND PROBLEM

In relation to the second problem, a primary cause of axial velocity $v_z$ spread in gyrotron devices is due to the fact that electrons emitted from the cathode of the gyrotron gun at different radial positions enclose different amounts of magnetic flux, commonly referred to as canonical angular momentum spread. As previously mentioned, several approaches are known to reduce the axial velocity $v_z$ spread and one of which is to reduce the cathode's annulus width. This is not however very practical, since this reduction creates a higher cathode loading factor, which has a tendency to overburden the cathode and, thereby, degrade its operational life characteristic. Another approach is to increase the cathode's mean radius. While this approach reduces velocity spread, it is accomplished at the expense of increasing the overall size of the gyrotron gun which may not be desired for some applications. An approach is to reduce the axial magnetic field on the surface of the cathode. An adaptation of this approach is to use a magnetic envelope and a magnetic center post as proposed by Chow and Pantell in the technical article "The Cyclotron Resonance Backward Wave Oscillator," documented in the proceedings of the IEEE, Vol. 48, pp. 1865–1867 (1980). In this technique, the center post carries the magnetic flux, while the magnetic envelope reduces the axial magnetic field on the cathode structure to virtually zero. However, a problem with this technique is that the magnetic center post is at essentially the same potential as that of the cathode; hence, practical implementations of this technique are prone to arcing between the center post and the anode due to large potential differences at their proximity. Moreover, this approach does not permit the flexibility of varying the beam canonical angular momentum spread to actively control the beam velocity spread for different applications of the gyrotron gun.

OBJECTS OF THE INVENTION

Accordingly, one object of the present invention, the double cusp gyro-gun, is to provide a gyrotron gun and a method of use thereof that have the flexibility of actively controlling the axial velocity $v_z$ spread so as to accommodate different applications of the gyrotron gun.

Another object of the present invention is to provide a gyrotron gun and a method of use thereof that actively control the gyrating electron's beam transverse-to-axial velocity, $\alpha=v_\perp/v_z$, as well as the position of the electron's beam guiding center, $r_g$, so as to allow the gyrotron gun to be used for both small and large orbiting applications.

A still further object of the present invention is to provide a gyrotron gun and a method of use thereof that provide the flexibility for independently and simultaneously controlling the gyrating electron beam transverse-axial velocity ratio, $\alpha=v_\perp v_z$; the position of the electron's beam guiding center, $r_g$; as well as the spread of the axial velocity, $v_z$.

SUMMARY OF THE INVENTION

The invention is directed to a gyrotron gun that is operated to independently and simultaneously control a gyrating electron beam transverse-to-axial velocity ratio, $\alpha=v_\perp v_z$; the position of the electron's beam guiding center, $r_g$; as well as the spread of the axial velocity $v_z$, thereby, allowing the gyrotron gun to be used for large-orbit, small-orbit and even linear-beam modes of operation.

The gyrotron gun generates and forms a beam of electrons manifesting electron gyrating around a guiding center and having rotational energy. This is so that efficient phase bunching will result from a resonant interaction between the electron gyration and transverse component of the electromagnetic wave in the ensuing beam-wave interaction circuit. The gyrotron gun comprises first, second and third field coils and first and second means for establishing an abrupt change in a magnetic field. The field coils and the devices for establishing an abrupt change are arranged to form three regions. The field coils are operated so that each supply a predetermined strength of an axial magnetic field to allow for the control of the gyrating electron beam transverse-to-axial velocity ratio, $\alpha=v_\perp/v_z$; the position of the electrons beam guiding center $r_g$; and the spread of the axial velocity, $v_z$, so that the gyrotron gun can be used for small and large-orbit and even linear-beam modes of operation.

BRIEF DESCRIPTION OF THE DRAWINGS

These and other objects, features and advantages of the present invention, as well as the invention itself, will become better understood by reference to the following detailed description when considered in connection with the accompanying drawings, wherein like reference numerals designate identical or corresponding plots throughout the several views, and wherein.

DETAILED DESCRIPTION OF THE PREFERRED EMBODIMENTS

Figure 1:
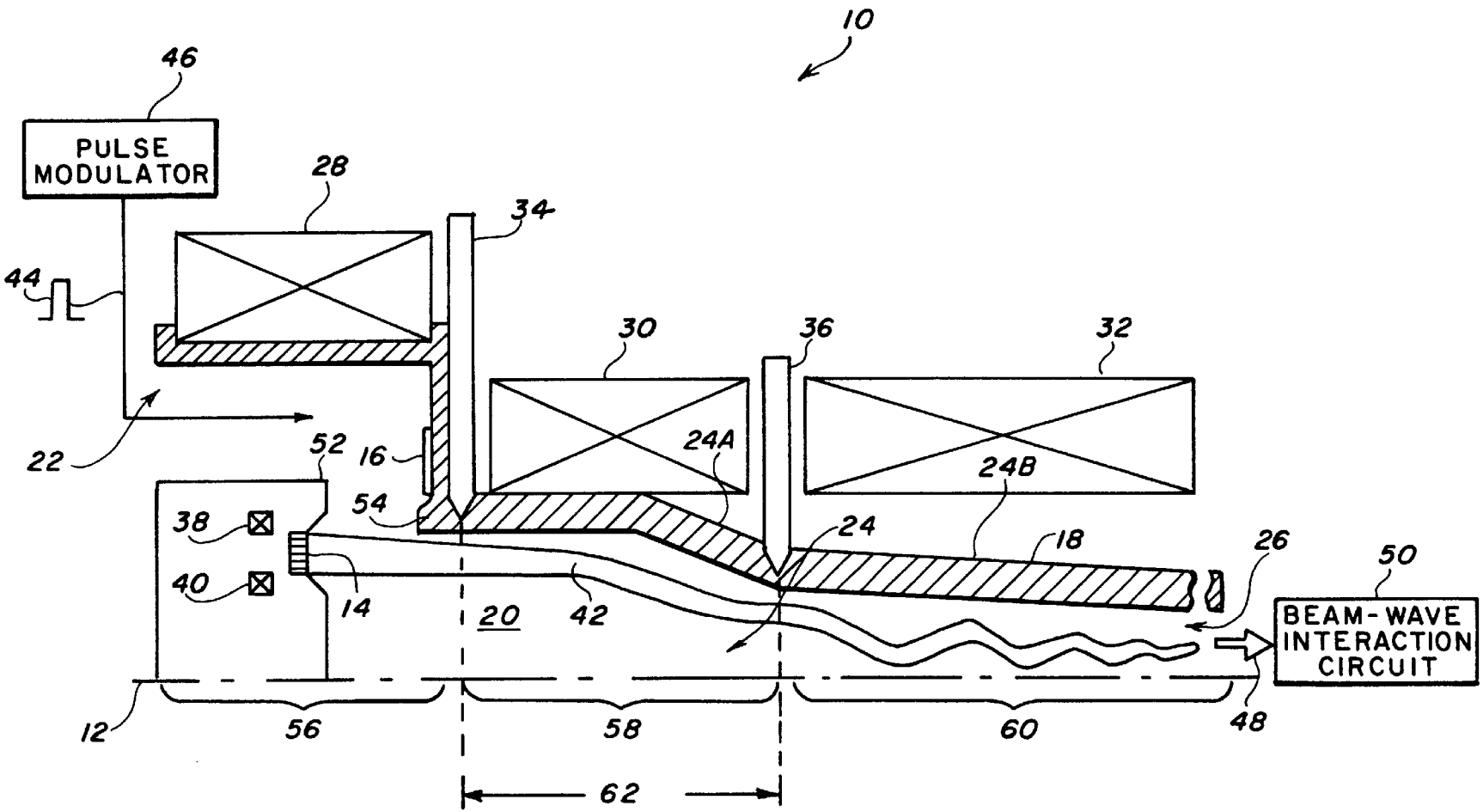
FIG. 1 is a schematic illustrating an arrangement of the interrelated elements of the present invention.

Referring now to the drawings, FIG. 1 illustrates an arrangement of elements of a gyrotron gun 10 having a centerline 12. The gyrotron gun 10 is preferably circular so that the arrangement of the elements of FIG. 1 is actually also below the centerline 12.

The gyrotron gun 10 generates gyrating electron beams in a controllable manner suitable for a wide range of applications. The gyrotron gun 10 has a predetermined operating period, sometimes referred to as a gyro-period, with a corresponding predetermined wavelength. The gyrotron device 10 may also be referred to herein as a double-cusp gyro gun 10. The gyrotron device 10 generates and forms a beam of electrons manifesting electron gyrating around a guiding center and having rotational energy. This is so that efficient phase bunching will result from a resonant interaction between electron gyration and a transverse component of electromagnetic waves contained in the ensuing beam-wave interaction circuit 50. The resonant interaction is determined by three factors which are: (1) the transverse-to-axial velocity ratio, $\alpha=v_\perp/v_z$, of the gyrating electron beam; (2) the position of the electron's beam guiding center, $r_g$, and (3) the spread of the axial velocity $v_z$ of the electron beam. The gyrotron device 10 of FIG. 1 comprises a plurality of elements each having a reference number all of which are given in Table 1.

TABLE 1

| REFERENCE NO. | ELEMENT |
|---|---|
| 14 | Cathode |
| 16 | Anode |
| 18 | Vacuum Envelope |
| 20 | Electron Tunnel |
| 22 | Entrance Section of Electron Tunnel 20 |
| 24 | Intermediate Section of Electron Tunnel 20 |
| 26 | Exit Section of Electron Tunnel 20 |
| 28 | First Field Coil |
| 30 | Second Field Coil |
| 32 | Third Field Coil |
| 34 | First Cusp Member |
| 36 | Second Cusp Member |
| 38 | First Bucking Coil |
| 40 | Second Bucking Coil |
| 42 | Electron Beam |

The cathode 14 is preferably of a thermionic type or any other electron emitting type and also preferably has an annular shape. As is known, the thermionic cathode 14, when subjected to a relatively high-voltage pulse 44, generated from a conventional power modulator 46 and present at the entrance section 22, allows the extraction therefrom of an electron beam 42 which is accelerated toward a higher potential anode 16, also located in the entrance section 22. The electron beam 42 moves along the full length of an electron tunnel 20 and is extracted from the exit section 26 thereof, as shown by arrow 48, into a beam-wave interaction circuit 50, known in the art. The beam-wave interaction circuit 50 converts the kinetic energy of the electron beam 42 into microwave energy.

Also as is known in the art, and as is shown in FIG. 1, the anode 16 (preferably of an annular shape) is offset from the cathode 14 and protrusions 52 and 54 are interposed therebetween allowing the electron beam 42 attracted to the anode 16 to be diverted away therefrom and directed toward the intermediate section 24.

The vacuum envelope 18, illustrated by a cross-hatch representation in FIG. 1, forms the electron tunnel 20 having the entrance section 22, the intermediate section 24 having first and second portions 24A and 24B, and the exit section 26. The vacuum envelope 18 is preferably formed of a non-magnetic metallic material and arranged in a manner known in the art.

The first, second and third field coils 28, 30, and 32, respectively, are preferably formed of a metallic material, known in the art, and are arranged so that the first field coil 28 is situated near the entrance section 22 and the second and third field coils 30 and 32 are situated at the intermediate section 24. The field coils 28, 30 and 32, as well as the bucking coils 38 and 40, are indicated in FIG. 1 with an X symbol.

The first and second cusp devices 34 and 36 preferably comprise a high permeability material, such as soft iron. The term "cusp" is known in the art and is meant to represent that the device provides for an abrupt change in a magnetic field as the magnetic field passes through the cusp device. The arrangement of the cusp devices 34 and 36, relative to the field coils 28, 30 and 32, provide for three different operating regions which are of particular importance to the present invention.

The first cusp device 34 is interposed between the first and second field coils 28 and 30, respectively. The second cusp device 36 is interposed between the second and third field coils 30 and 32, respectively. The first field coil 28 and the first cusp device 34 establish a first operating region 56. Further, the first cusp device 34 and the second cusp device 36, both in combination with the second field coil 30, establish a second operating region 58. Further, the second cusp device 36 and the third field coil 32 establish a third operating region 60. The first (56), second (58), and third (60) operating regions are respectively herein termed the diode region 56, the double-cusp region 58, and the adiabatic compression region 60. The first cusp device 34 and the second cusp device 36 are spaced apart, as shown in FIG. 1, from each other by a distance 62 which preferably corresponds to one-half of the operating gryo-period of the gyrotron device 10.

The first and second bucking coils 38 and 40 are supplied with opposite currents and are located near, but preferably behind, the cathode 14, as shown in FIG. 1, so as to reduce or even cancel the axial magnetic field on the cathode surface in a manner as to be further described hereinafter with reference to FIGS. 6 and 7.

The parameters of the electron beam 42 formed and generated by the gyrotron gun 10 are controlled by the field strength of the axial magnetic fields applied to the regions 56, 58 and 60 by way of the first, second and third field coils 28, 30 and 32, respectively. The operation of the gyrotron device 10 is primarily determined by a magnetic profile 64, which may be further described with reference to FIG. 2.

Figure 2:
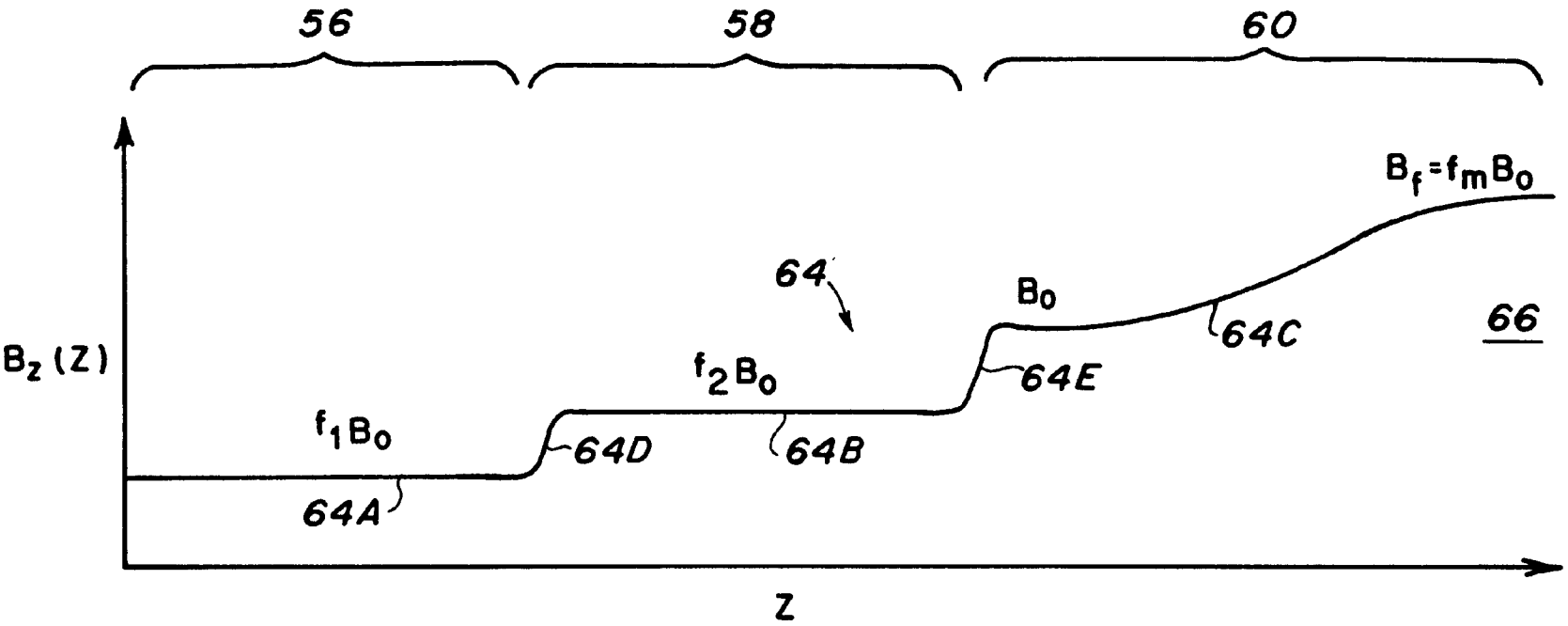
FIG. 2 illustrates a plot of the magnetic profile of the present invention.

FIG. 2 illustrates the magnetic profile 64 of the electron beam 42 as it passes through and is developed therein by the diode, double-cusp and adiabatic compression regions 56, 58 and 60, respectively, and propagates to the tip 66 of the exit section 26, whereby the kinetic energy of the electron beam 42 is extracted by the beam-wave interaction circuit 50 to provide microwave energy therefrom. FIG. 2 has a horizontal axis, given by the quantity, z, representative of the axial position of the electron beam 42 as it moves along the gyrotron device 10, as generally illustrated in FIG. 1. Further, FIG. 2 has a vertical axis represented by the quantity $B_z$ (Z) which is the average axial magnetic field enclosed by the electron beam 42.

The magnetic profile 64 comprises a first section 64A, a second section 64B, and a third section 64C, respectively, associated with regions 56, 58 and 60, and respectively represented by the quantities $f_1B_0$, $f_2B_0$ and $B_0$ and $B_f=f_mB_0$, wherein the quantities $B_0$ and $B_f=f_mB_0$ are present at the initial and terminal portions, respectively, of the third section 64C. The cusp devices 34 and 36 (see FIG. 1) impart a rotation to the electron beam 42 which impartations are generally illustrated in FIG. 2 by ramping portions 64D and 64E respectively.

In general, the usage of the first and second cusp devices 34 and 36, the selection of the quantities $f_1B_0$, $f_2B_0$, $B_0$ and $f_mB_0$, determined by the operation of the first, second and third field coils 28, 30 and 32 respectively, as well as the operation of the bucking coils 38 and 40, provide for independent and simultaneous control of the three factors: (1) the transverse-to-axial velocity ratio, $\alpha=v_\perp/v_z$; (2) the position of the electron's beam guiding center, $r_g$; and (3) the axial velocity spread, all of which three factors have been previously discussed in the "Background" section. The operation and method of the present invention provide the capability to optimize the energy conversion in the beam-wave interaction circuit 50 without modifying the mechanical features of the double cusp gyro gun 10. More particularly, once the physical features, composition and arrangement of the elements of the double-cusp gyro gun 10 are selected, they do not need to be changed, but rather only the amount of current applied to the field coils 28, 30 and 32 and bucking coils 38 and 40 need to be adjusted to control the operating parameters of the double-cusp gyro gun 10. Thus, problems and limitations associated with prior art beam-forming practices, discussed in the "Background" section, are avoided.

The trajectory of the electrons forming beam 42, after extraction from the cathode 14, is dictated primarily by the magnetic field profile 64, via Lorentz force. Evaluation of such a trajectory is based on an idealized theoretical model which employs the principle of canonical angular momentum conservation. The canonical angular momentum, $P_\theta$, of an electron charge q, mass m and energy $\gamma$, at radius r, axial position z, and angular velocity $v_\theta$ may be represented by expression 1 given below:

$$P_\theta=\gamma m r v_\theta - q r A_\theta(r,z) \tag{1}$$

The term $P_\theta$ represent a conserved quantity in an azimuthally symmetric system. The vector potential, $A_\theta$(rz), for the total magnetic field profile 64, may be estimated by expression 2 given below:

$$A_\theta(r,z)=\tfrac{1}{2} r B_z(z) \tag{2}$$

where $B_z$ (z) is the average axial magnetic field enclosed by an electron forming part of the electron beam 42. With the quantity $\omega_{c2}\equiv(qB_z)/(\gamma m)$, the canonical angular momentum may be represented by expression 3 given below which is treated as a conserved quantity throughout the entire gyrotron device 10:

$$P_\theta=(\gamma m)[rv_\theta-\tfrac{1}{2}r^2\omega_{cz}(z)] \tag{3}$$

As previously mentioned with reference to FIG. 2, the first cusp device's 34 transition field imparts an angular velocity to the electron beam 42, via the $v_z \times B_r$ Lorentz force term, hence, initiating cyclotron motion within the double-cusp region 58. From conservation of the canonical angular momentum, it can be shown that the electron perpendicular velocity in the double-cusp region 58 may be represented by expression 4 given below:

$$v_{\perp 1+}=\tfrac{1}{2}(1-f_1)f_2\omega_{co}r_1 \tag{4}$$

where $r_1$ is assumed to be the electron radial position at the cathode 14 and also at the first cusp device 34; $f_1$ and $f_2$ are the axial magnetic field quantities respectively related to the diode region 56 and the double cusp region 58, and $\omega_{co}$ is the electron angular cyclotron frequency at the start of the adiabatic compression region 60. More particularly, with reference to FIG. 2, the quantities $f_1$ and $f_2$ are respectively included in sections 64A and 64B of magnetic profile 64 and the quantity $\omega_{co}$ is included in the peak of the ramp portion 64E of the magnetic profile 64. It should be pointed out that the electron perpendicular motion immediately after the first cusp device 34 is primarily azimuthal, since the electron motion has assumed to be paraxial in the diode region 56. Based on this assumption, the electron position at the second cusp device 36 where the electron radial velocity vanishes may be represented by the expression 5 given below:

$$r_2=f_1r_1 \tag{5}$$

As previously mentioned, the distance 62 (see FIG. 1) between the two cusp devices 34 and 36 is preferably and precisely one-half of a gyro-period. For such a preferred distance 62, the electron motion in the double-cusp region 58 is that of a small-orbit (non-axis encircling) gyration wherein its guiding center may be represented by expression 6 given below:

$$r_{g1+}=\tfrac{1}{2}(1+f_1)r_1 \tag{6}$$

At the second cusp device 36, the radial magnetic field thereat imparts an additional velocity thrust on the electron beam (see FIG. 2, in particular, ramp portion 64E). As further seen in FIG. 2, the field strength at the exit of the double-cusp region 58 is $B_0$ which is illustrated near the termination of the ramp portion 64E which corresponds to the second cusp device 36 transition region of the profile 64. Upon leaving the transition region of the second cusp device 36, the perpendicular velocity may be represented by expression 7 given below:

$$V_{\perp 2+}=\tfrac{1}{2}(f_1-f_2)\omega_{co}r_1 \tag{7}$$

The guiding center region at the beginning of the adiabatic compression region 60 may be represented by expression 8 given below:

$$\begin{aligned} r_{g2+} &= r_2 - \frac{V_{\perp 2+}}{\omega_{co}} \\ &= 1/2(f_1+f_2)r_1 \end{aligned} \tag{8}$$

It should be noted, and as will be further discussed hereinafter with reference to FIGS. 6 and 7, that for a particular case wherein $f_1=-f_2$, there is no beam guiding center spread. The ratio of the perpendicular velocity to axial velocity is found from energy conservation and may be represented by expression 9 given below:

$$\begin{aligned} \alpha_{2+} &= \frac{v_{\perp 2+}}{[v_o^2 - v_{\perp 2}+^2]^{1/2}} \\ &= \left[\frac{1/4(f_1-f_2)^2\omega^2_{co}r_1^2}{v_o^2 - 1/4(f_1-f_2)^2\omega^2_{co}r_1^2}\right]^{1/2} \end{aligned} \tag{9}$$

where $v_o$ is the electron velocity at the exit of the diode region 56.

From expressions (7) and (8) it may be shown that by properly selecting the magnetic field profiles, in particular the quantities $f_1$ and $f_2$, a wide variety of beam configurations can be generated and are shown in Table 2.

TABLE 2

| QUANTITIES $f_1$ AND $f_2$ OF MAGNETIC FIELD PROFILE 64 | BEAM CONFIGURATION |
|---|---|
| ($f_1 = f_2$) | Linear Beam |
| ($\lvert f_1\rvert = -\lvert f_2\rvert$) | Large-Orbit |
| ($f_1 \neq f_2$) | Small-Orbit |

The present invention also provides a means to control independently the beam guiding center $r_g$, and the transverse-to-axial $\alpha=v_\perp/v_z$ via selecting the sum, $f_1+f_2$, and the difference, $f_1-f_2$, of quantities of diode region 56 and of double-cusp region 58.

Finally, after the adiabatic compression region 60 alters the axial field strength from $B_0$ to $B_f=f_mB_0$, the guiding center $r_g$ sometimes referred to as $r_{gf}$, and transverse-to-axial velocity ratio $\alpha$, sometimes referred to as $\alpha_f$, at the tip 66 (see FIG. 2) of the gyrotation device 10 as it enters the beam-wave interaction circuit 50 may be respectively represented by expressions 10 and 11 given below:

$$r_{gf} = \frac{1}{f_m^{1/2}}r_{g2+} = \frac{f_1+f_2}{2f_m^{1/2}}r_1 \tag{10}$$

$$\alpha_f = \left[\frac{(\alpha_{2+})^2 f_m}{1+(1-f_m)(\alpha_{2+})^2}\right]^{1/2} = \left[\frac{1/4f_m^{-1}(f_1-f_2)^2\omega^2_{cf}r_1^2}{v_0^2 - 1/4f_m^{-1}(f_1-f_2)^2\omega^2_{cf}r_1^2}\right]^{1/2} \tag{11}$$

where $\omega_{cf}$ is the angular cyclotron frequency at the $r_f$ interaction region of the beam-wave interaction circuit 50.

In addition to the relationships given by the expressions 10 and 11 for terms normally referred to as $r_g$ and $\alpha$, for a gyrotron gun 10 satisfying the requirements that the distance 62 between the two cusp devices 34 and 36 (see FIG. 1) being one-half of a gyro-period in length, the gyrotron device 10 further has interrelationship between the quantities $f_2$ and $f_m$. That is, the ratio $f_2/f_m$ is determined by both $f_2B_0$ (half gyro-period criterion), and $f_mB_0$ (interaction circuit 50 requirement). Consequently, for a given value of the parameter $B_f$, it is possible to adjust the guiding center, $r_g$, and the transverse-to-axial velocity ratio, $\alpha$, independently by adjusting the quantities $f_1$ and $f_2$. More particularly, the employment of the double-cusp region 58 in the gyrotron gun 10 permits the independent control over the parameters ($\alpha$, $r_g$, and B) in a relatively simple manner by means of selecting and adjusting the quantities $f_1$, $f_2$, and $f_m$, hence, achieving more flexibility with less complexity as compared to prior art beam-forming apparatuses.

It is important to emphasize, however, that the necessity that the radial velocity vanish (see expression (5)) at the second cusp device 36 (hence, the half-gyro-period length criterion discussed for distance 62) is not really needed for small-orbit operations of the gyrotron gun 10. However, for linear and large-orbit operations of the gyrotron gun 10, it is desired that the radial velocity be zero (see expression (5)) at the second cusp device 36 so as to ensure that beam ripple (scalloping) is minimized.

It should now be appreciated that the practice of the present invention provides for a gyrotron gun 10 employing a first and second cusp devices 34 and 36, respectively, that allow for the ability to provide independent and simultaneous control of the quantities of expressions 10 and 11, that is, guiding center $r_g$ and transverse-to-axial velocity ratio $\alpha$ respectively. Furthermore, it should be appreciated that the control of the guiding center $r_g$ and transverse-to-axial velocity ratio $\alpha$ is accomplished simply by varying the magnetic field profile 64 shown in FIG. 2 and is done so without modifying or altering any physical features of the gyrotron gun 10.

In the practice of the present invention, a beam optic simulation study was performed. In the study, the mechanical features of the gyrotron gun 10 remain fixed and only the magnetic field profile 64 was varied to affect various final beam parameters that allowed the gyrotron gun 10 to provide small and large-orbits and linear beam modes of operation. The magnetic field profiles were obtained from a magnetic design code, POISSON, by specifying the currents for the electric field coils 28, 30 and 32, and the bucking coils 38 and 40 all shown in FIG. 1. The POISSON is a well-known magnetic design code developed by Los Alamos National Laboratories. The magnetic field profiles obtained from the POISSON magnetic design were used as inputs to a MAGIC code to perform beam optics simulation. The MAGIC code is a self-consistent, two-and-one-half dimensional, particle-in-cell code developed by Mission Research Corporation and is known in the art. The study performed for the gyrotron device 10 resulted in different beam types exemplified by three beam optic cases shown in FIGS. 3, 4 and 5 and respectively representative of a large-orbit operation, a small-orbit operation, and a linear beam mode of operation.

Figures 3A, 3B, 3C:
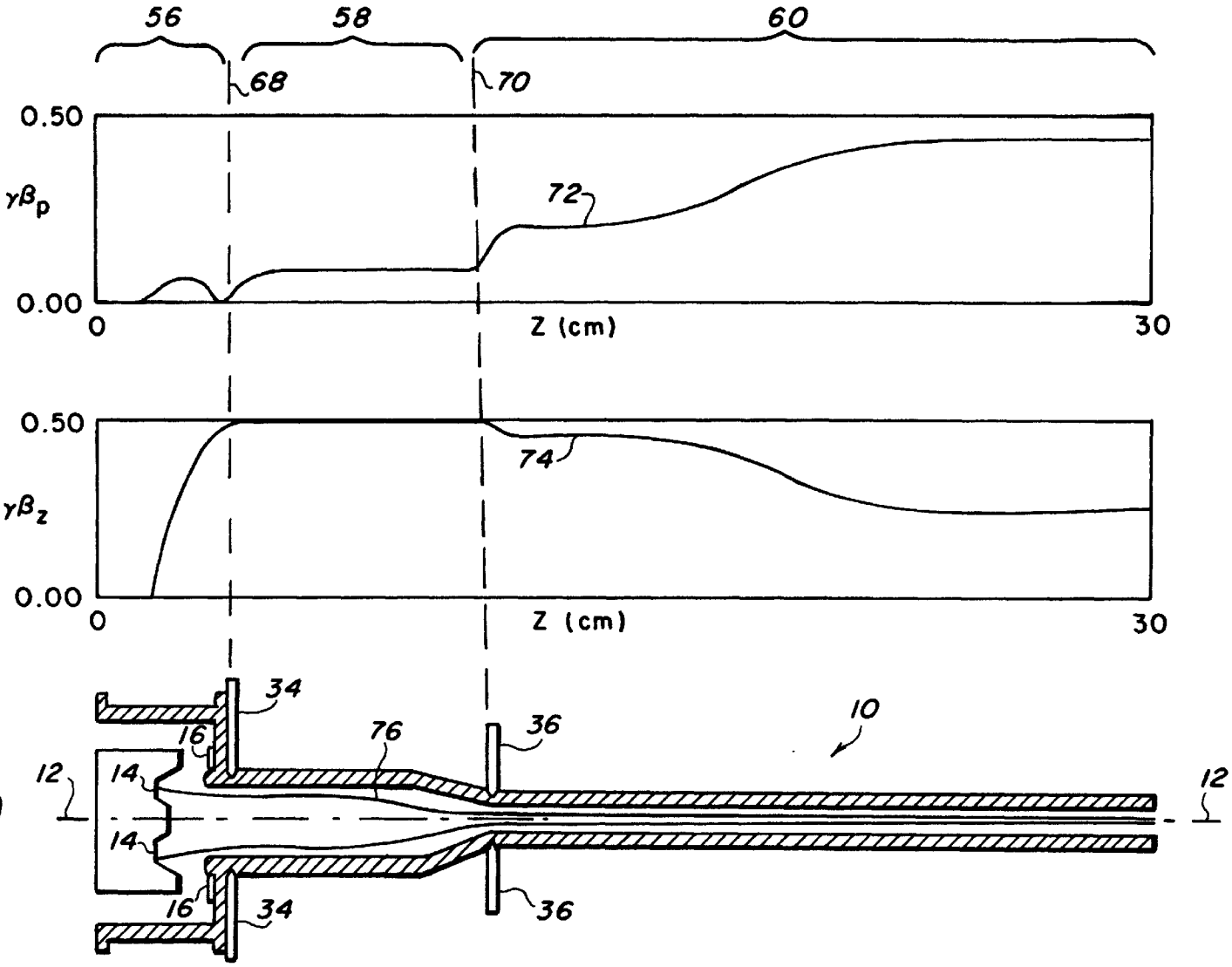
FIG. 3 is composed of FIGS. 3(A), (B), and (C), wherein FIGS. 3(A) and 3(B) each illustrates a plot useful in the understanding in the large-orbit operation of the gyrotron gun of the present invention which is generally illustrated in FIG. 3(C)

FIG. 3 is composed of FIGS. 3(A), (B) and (C), wherein FIGS. 3A and 3B respectively illustrates the beam perpendicular $\gamma\beta_p$ and axial momenta $\gamma\beta_z$, normalized by the speed of light as a function of axial distance. A gyrotron gun 10 is generally illustrated in FIG. 3(C), but without the placement of the field coils 28, 30 and 32 thereon. FIGS. 3(A), (B) and (C) are all interrelated to the diode region 56, double-cusp region 58, and the adiabatic compression region 60 (shown above FIG. 3(A)) and the interrelationship thereof is shown by the use of dimensional lines 68 and 70. FIG. 3 shows a beam perpendicular momentum plot 72 (FIG. 3(A), an axial momentum plot 74 (FIG. 3(B)) and a beam trajectory 76 (FIG. 3(C)), all corresponding to the usage of the gyrotron gun 10 for a large-orbit operation, where the resulting beam trajectory 76 is rotated around the gyrotron axis 12 (axis encircling). The large-orbit operation of FIG. 3 was accomplished by the use of a 60 kV, 4.4-A electron beam, which was also used in the operations illustrated in FIGS. 4 and 5.

Figures 4A, 4B, 4C:
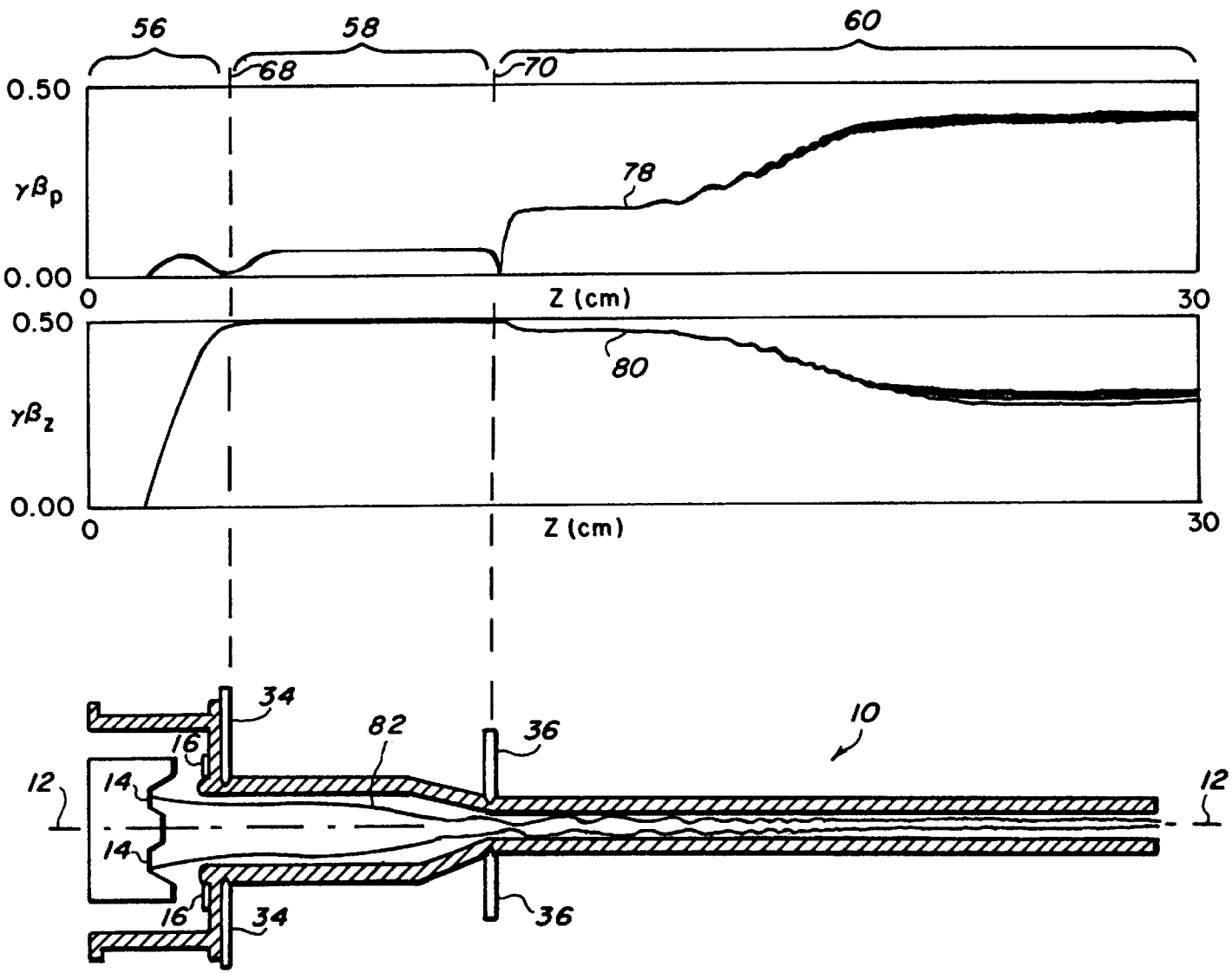
FIG. 4 is composed of FIGS. 4(A), (B), and (C), wherein FIGS. 4(A) and 4(B) each illustrates a plot useful in the understanding of the small-orbit operation of the gyrotron gun of the present invention which is generally illustrated in FIG. 4(C)

FIG. 4 is similar to FIG. 3 and illustrates a plot 78 of the beam perpendicular momentum quantity $\gamma\beta_p$ (FIG. 4(A)), a plot 80 of the axial momentum quantity $\gamma\beta_z$ (FIG. 4(B)) and a beam projectory 82 (FIG. 4(C)), all related to the small-orbit operation of the gyrotron gun 10. As is known in the art, for a small-orbit operation, the electrons comprising electron beam 42 of FIG. 1 are rotated around and off-axis from its guiding center $r_g$.

Figures 5A, 5B, 5C:
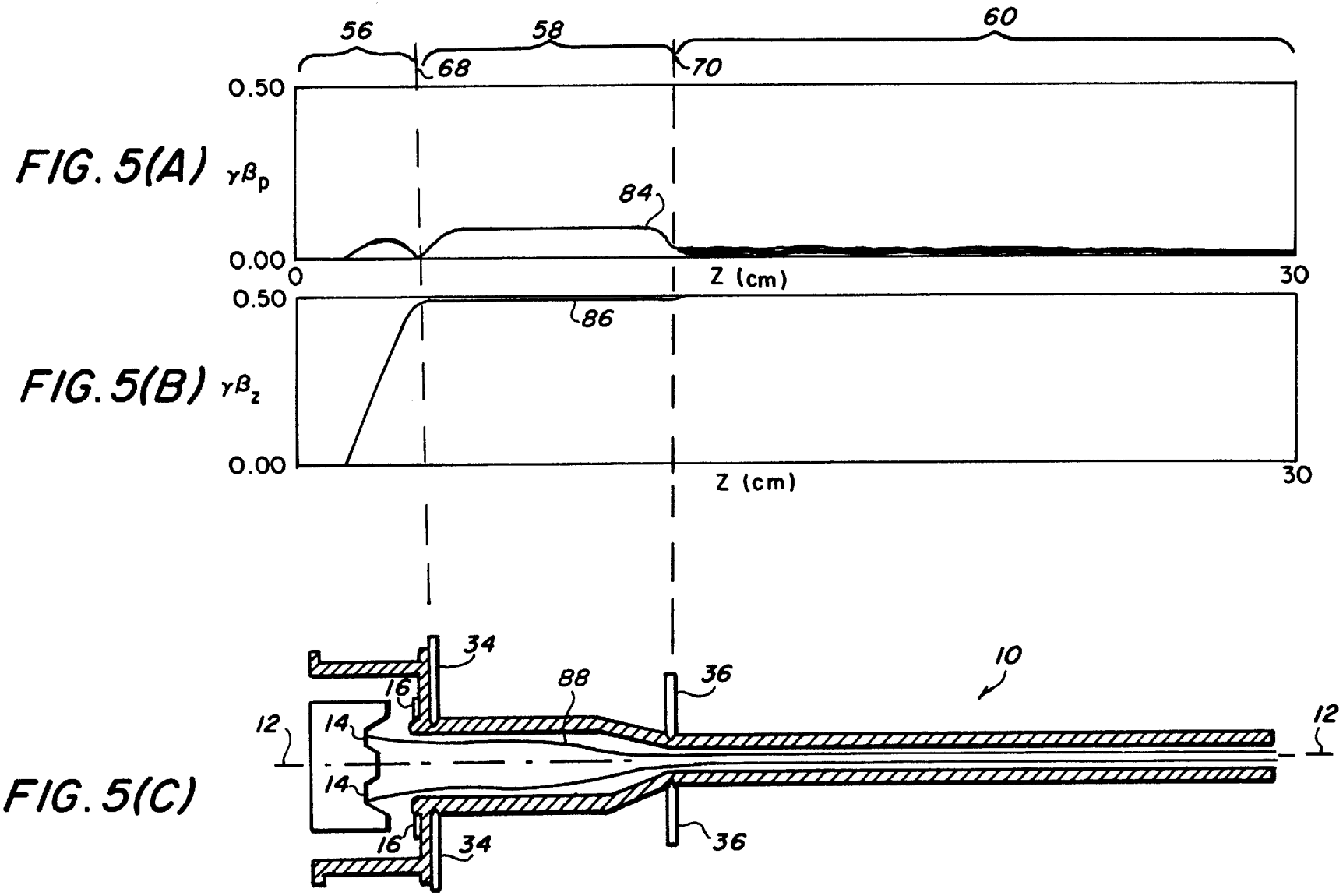
FIG. 5 is composed of FIGS. 5(A), (B), and (C), wherein FIGS. 5(A) and 5(B) each illustrates a plot useful in the understanding of the linear-mode operation of the gyrotron gun of the present invention which is generally illustrated in FIG. 5(C)

FIG. 5 is similar to both FIGS. 3 and 4 and illustrates a plot 84 of the beam perpendicular momentum quantity $\gamma\beta_p$ (FIG. 5(A)), a plot 86 of the axial momentum quantity $\gamma\beta_z$ (FIG. 5(B)), and a beam projectory 88 (FIG. 5(C)), all related to a linear-beam mode of operation of the gyrotron gun 10. The linear-beam operation is one in which the beam is non-rotating. It should be noted in FIG. 5(A) that the perpendicular momentum $\gamma\beta_p$ essentially vanishes after the second cusp device 36 (not shown) that separates the double-cusp region 58 from adiabatic compression region 60.

It should now be appreciated that the practice of the present invention provides for a gyrotron gun 10 wherein the quantities given in Table 2 may be selected so as to provide for a small-orbit, large-orbit or linear modes of operation.

As mentioned in the "Background" section, the energy conversion efficiency of the beam-wave interaction circuit 50 is dependent upon the beam velocity spread. As further discussed in the "Background" section, various approaches were used to control the beam velocity spread, but none yielded complete success. The present invention accomplishes such control by the use of the bucking coils 38 and 40. More particularly, the bucking coils 38 and 40 are supplied with opposite currents and preferably located behind the cathode 14 so as to reduce or even cancel the axial magnetic field on the surface of the cathode 14 and, hence, the canonical angular momentum spread. This technique permits the active control of the beam velocity spread and also avoids potential arcing problems discussed in the "Background" section. Further, this technique provides the gyrotron gun 10 with the ability to operate in the large and small-orbit modes of operation which may be further described with reference to FIGS. 6 and 7 illustrating results that were obtained from the aforementioned particle simulation study, already described with reference to FIGS. 3, 4 and 5.

Figure 6A:
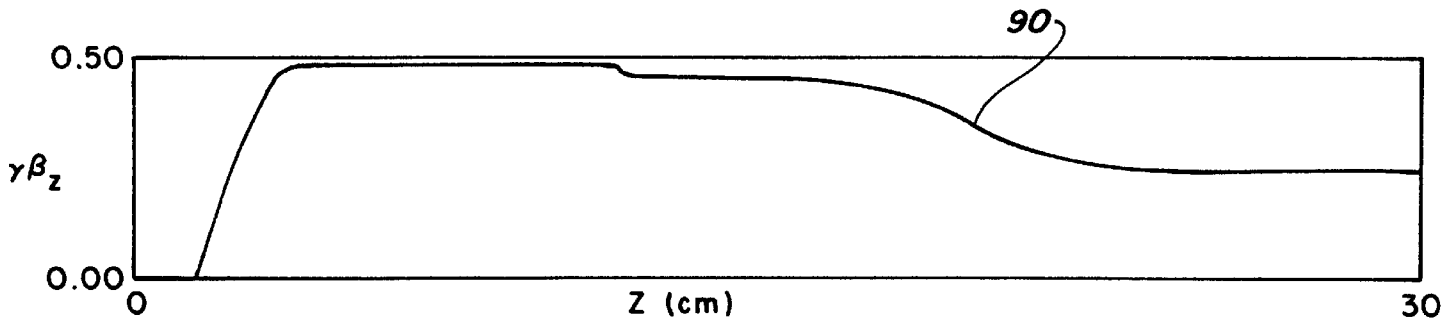
FIG. 6 is composed of FIGS. 6(A), and (B), each of which illustrates a plot related to the axial velocity, $v_z$, spread associated with the large-orbit operation of the gyrotron gun of the present invention.
Figure 6B:
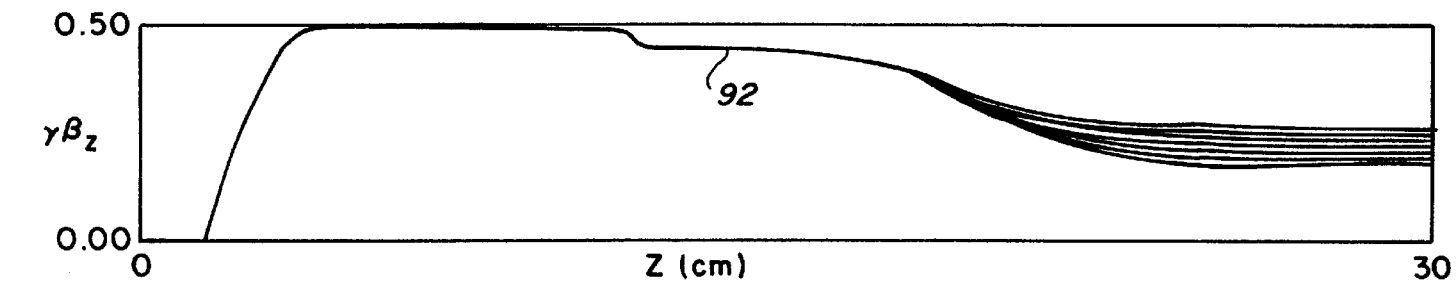

FIG. 6 is composed of FIGS. 6(A) and 6(B) both of which show the electron beam 42 normalized in axial momentum vs axial distance for two separate large-orbit simulations, similar to each other except for the amount of canonical angular momentum $P_\theta$ spread. FIG. 6(A) illustrates the normalized axial momentum $\gamma\beta_z$ shown by plot 90, wherein the bucking coils 38 and 40 are completely activated (no $P_\theta$ spread). Conversely, FIG. 6(B) illustrates the normalized axial momentum $\gamma\beta_z$ shown by plot 92 resulting from the bucking coils 38 and 40 being turned-off, thereby, providing for an axial velocity spread of 11.2% at $\alpha$=1.83. The large velocity spread indicates that the $P_\theta$ quantity is one of the main contributors that cause for velocity spread in large-orbit beams.

Figures 7A, 7B, 7C:
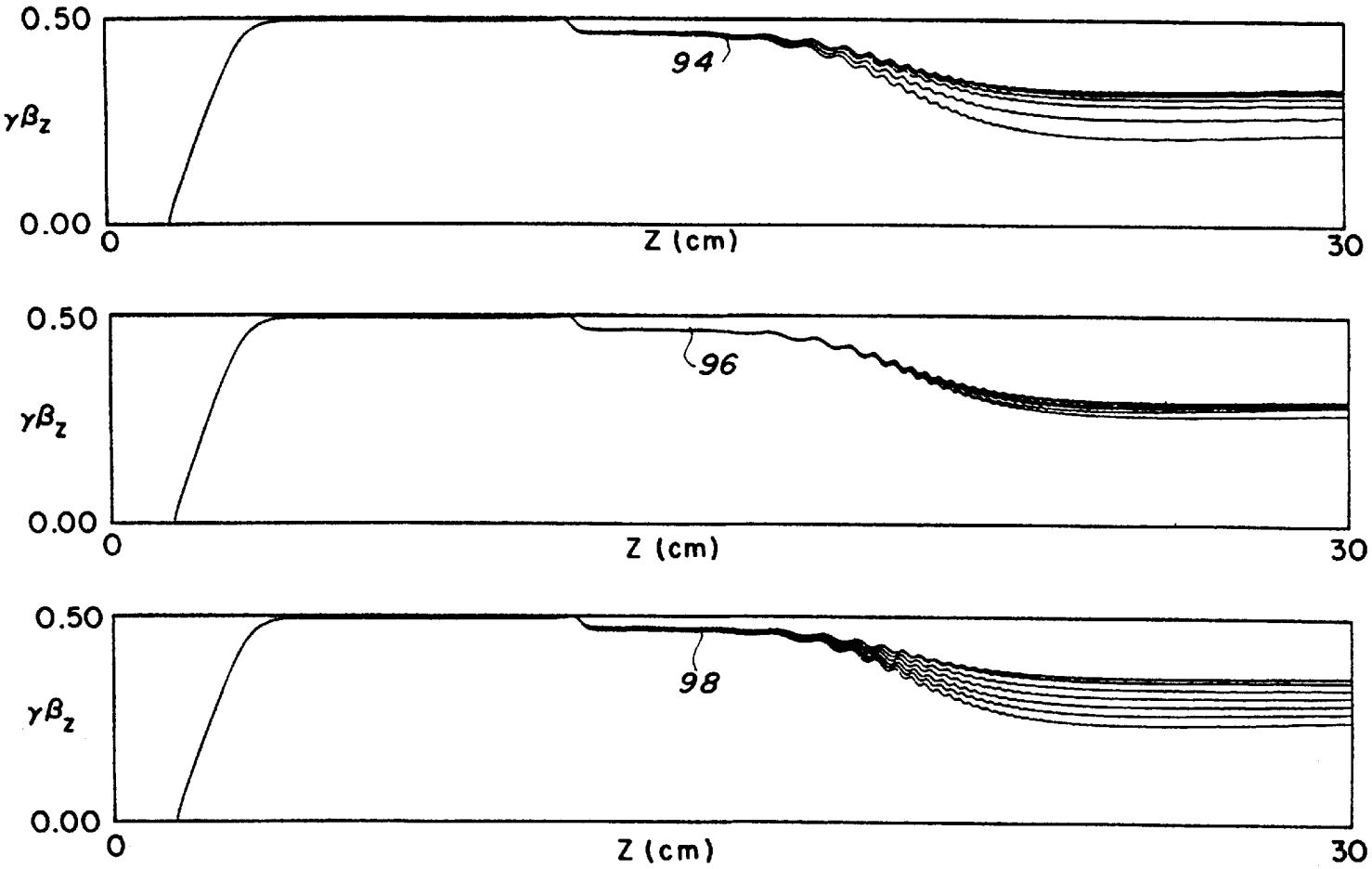
FIG. 7 is composed of FIGS. 7(A), (B), and (C), each of which illustrates a plot related to the axial velocity, $v_z$, spread associated with the small-orbit operation of the gyrotron gun of the present invention.

FIG. 7 is composed of FIGS. 7(A), (B) and (C) all related to small-orbit operations of gyrotron device 10. FIG. 7(A), (B) and (C) respectively illustrates plots 94, 96 and 98, wherein, respectively, the bucking coils 38 and 40 are fully turned on, the bucking coils 38 and 40 are partially turned on, and the bucking coils 38 and 40 are turned off. The plot 94 indicates a final velocity spread of 3.9% at $\alpha$=1.4, the plot 96 indicates a final velocity spread of 1.6% at $\alpha$=1.35, and the plot 98 indicates a final velocity spread of 14.5% at $\alpha$=1.2. A comparison between plots 94, 96 and 98 reveals that the gyrotron device 10, in particular, the bucking coils 38 and 40 act as a means for controlling the velocity spread related to the small-orbit beam operation, and also that this velocity spread may be advantageously adjusted for various applications by the practice of this invention.

It should now be appreciated that the practice of the present invention provides for a means for controlling the axial velocity $v_z$ spread, the gyrating electron transverse-to-axial velocity ratio $\alpha$, as well as the electron beam guiding center, $r_g$. These factors are controlled by the diode region 56, the double-cusp region 58, and the adiabatic compression region 60 carrying an adjustable and predetermined magnetic profile 64.

It should therefore readily be understood that many modifications and variations of the present invention are possible within the purview of the claimed invention. It is, therefore, to be understood that, within the scope of the appended claims, the invention may be practiced otherwise than as specifically described.

What is claimed and desired to be secured by Letters Patent of the United States is:

1. A system for generating and forming a beam of electrons comprising:

(a) a vacuum envelope forming a tunnel having entrance, intermediate and exit sections with the intermediate having first and second portions;

(b) first, second and third field coils with the first being situated at said entrance section and the second and third being situated at said intermediate section;

(c) first and second means for establishing an abrupt change in a magnetic field, said first and second abrupt change means being respectively interposed between said first and second field coils and said second and third field coils, said first field coil and said first abrupt change means comprising a first operating region, said second field coil and said first and second abrupt change means comprising a second operating region and said third field coil and said second abrupt change means comprising a third operating region;

(d) a cathode located in said entrance section and capable of emitting a beam of electrons when subjected to the presence of a relatively high voltage pulse; and (e) an anode located in said entrance section and spaced apart from said cathode and capable of attracting said beam of electrons.

2. The system for generating and forming an electron beam according to claim 1 further comprising a pair of bucking coils located near said cathode.

3. The system for generating and forming an electron beam according to claim 1 further comprising an interaction circuit connected to said exit portion and extracting microwave energy from said beam of electrons.

4. The system for generating and forming an electron beam according to claim 1, wherein said cathode is thermionic or comprises other electron emitting devices.

5. The system for generating and forming an electron beam according to claim 1, wherein said cathode and said anode both have an annular shape.

6. The system for generating and forming an electron beam according to claim 1, wherein said cathode and anode are offset from each other and have protrusions interposed therebetween so that said beam of attractable electrons are diverted away from said anode and directed toward said intermediate section.

7. The system for generating and forming an electron beam according to claim 1, wherein said vacuum envelope, said first, second and third field coils and said first and second means for establishing an abrupt change in a magnetic field comprise a gyrotron device having a predetermined operating period with a corresponding predetermined wavelength and said first and second means for establishing an abrupt change are spaced apart from each other by a distance corresponding to one-half of said predetermined wavelength.

8. A method using a gyrotron gun having a cathode that emits a beam of electrons when subjected to the presence of a relatively high voltage pulse and an anode spaced apart from said cathode and energized with respect to said cathode so that said beam of electrons are attractable toward said anode, said gyrotron gun generating and forming a beam of electrons manifesting electron gyrating around a guiding center and having rotational energy, said beam-forming being determined by at least two factors: (1) the transverse-to-axial velocity ratio, $\alpha$, of the gyrating electron beam; and (2) the position of the electron's mean guiding center, $r_g$, said method comprising the steps of:

(a) providing a vacuum envelope that forms a tunnel having entrance, intermediate and exit sections with the intermediate section having first and second portions;

(b) arranging first, second and third field coils with the first being situated at said entrance section and the second and third being situated at said intermediate section;

(c) interposing first and second means for establishing an abrupt change in a magnetic field, said imposition placing said first means for establishing an electric field between said first and second field coils and said second means for establishing an abrupt change in a magnetic field between said second and third field coils, said first field coil and said first abrupt changing means comprising a first operating region, said second field coil and said first and second abrupt change means comprising a second operating region, and said third field coil and said second abrupt change means comprising a third operating region;

(d) adjusting the first field coil to supply the strength of an axial magnetic field corresponding to a first predetermined quantity $f_1$ in said first operating region;

(e) adjusting the second field coil to supply the strength of an axial magnetic field corresponding to a second predetermined quantity $f_2$ in said second operating region;

(f) adjusting the third field coil to supply the strength of an axial magnetic field corresponding to a third predetermined quantity $f_3$ in said third operating region;

(g) adjusting said $f_1$ and $f_2$ quantities to one of the following relationships: (1) $(f_1=f_2)$; (2) $(|f_1|=-|f_2|)$ and (3) $(f_1 \neq f_2)$.

9. The method of using a gyrotron gun according to claim 8, wherein said beam-forming is further determined by a third factor: (3) the spread of the axial velocity $v_z$ of said beam and wherein said method further comprises the steps of:

(h) arranging a pair of bucking coils near said cathode; and (i) adjusting the level of current in said bucking coils to control said spread of axial velocity of said beam.

* * * * *